Sept. 22, 1964  R. G. HYVER  3,149,415
METHOD OF PRODUCING WELDED BIMETALLIC
TUBULAR CONNECTIONS
Filed June 1, 1959  2 Sheets-Sheet 1
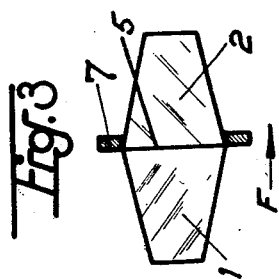
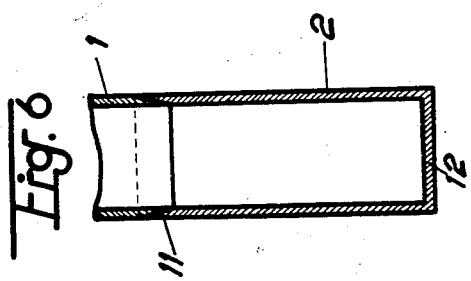
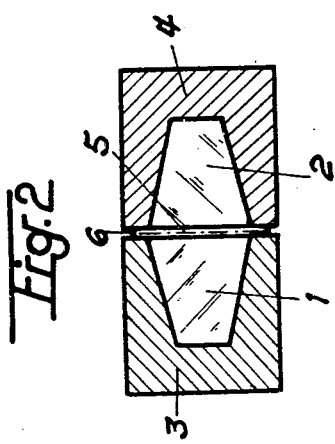
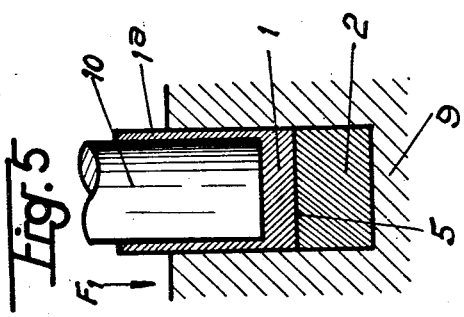
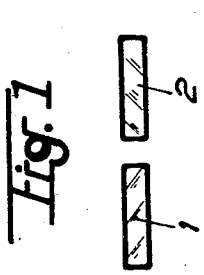
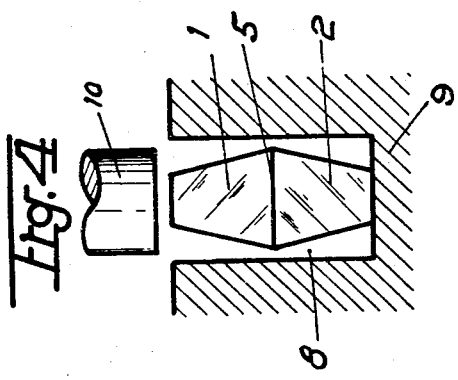
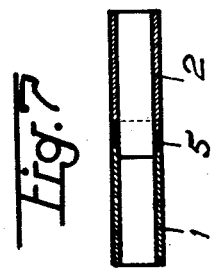
INVENTOR
RENE-GABRIEL HYVER
By Linton and Linton
ATTORNEYS

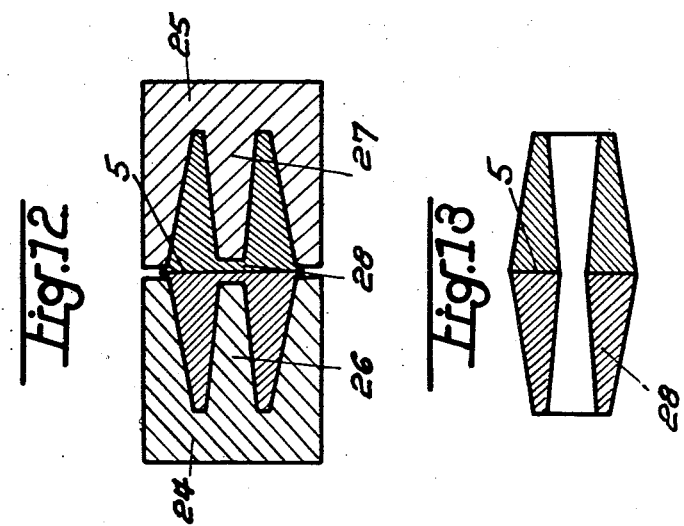
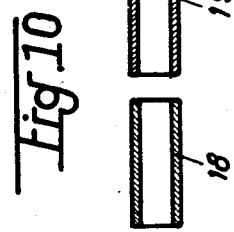
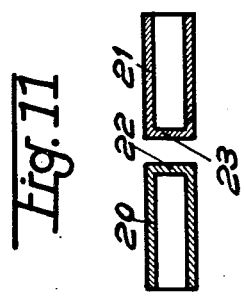
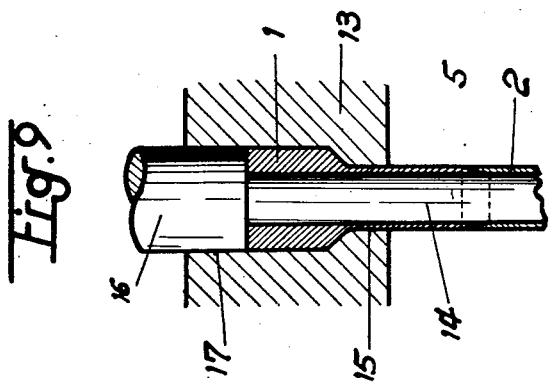

United States Patent Office 3,149,415
Patented Sept. 22, 1964

3,149,415
METHOD OF PRODUCING WELDED BIMETALLIC TUBULAR CONNECTIONS
René Gabriel Hyver, Saint-Gratien, France, assignor to Etablissements Aurousseau & Cie, Saint-Gratien, France, a company of France
Filed June 1, 1959, Ser. No. 817,260
4 Claims. (Cl. 29—480)

The present invention has for its object tubular connections and, more particularly, a connection constituted by the assembly of two different metals which are welded together, said connection being more particularly suitable for the assembly of parts to be incorporated with ice machines, condensers, heating apparatus and the like whenever the two parts to be assembled are made of two different metals which it is difficult to weld together.

For sake of simplicity, I will term hereinafter such a connection a tubular copper-and-aluminium connection, although said metals are mentioned only by way of example, whereas the invention is applicable to all metals adapted to be extruded.

The method according to the invention consists chiefly in welding endwise two metal parts adapted to form the connection and in subjecting the bimetallic member thus obtained to extrusion.

For welding the two metal parts, it is preferable to resort to shock welding, which latter may be executed at room temperature or at raised temperature according to the couple of metals chosen for assembly.

Similarly, the subsequent extrusion which is to produce the connection can be executed either at room temperature or at raised temperature and it is possible to resort, according to the case, to a reversed extrusion or to a direct extrusion.

Obviously, the invention also covers the tubular connection and similar members which may be obtained through the method which has just been defined. These members distinguish chiefly from all known connections through the fact that the welded surface between the two parts forming it which has a flat shape immediately after the welding operation, becomes practically frusto-conical after the subsequent extrusion step, the generating line of the frusto-cone being oblique with reference to the longitudinal axis of the tube, as in the case of all known connections.

Furthermore, these novel connections distinguish from all known connections obtained previously through other methods by a considerable resistance against tractional and/or flexional stresses associated with a considerable reduction in the porosity of the connection in the area of the weld between the two metals.

Connections of the type disclosed may be used as follows: assuming it is desired to assemble a copper member with an aluminium member, a copper-and-aluminium connection obtained in accordance with the method forming the object of the invention is used and the copper end of said connection is welded to the copper member, while the aluminium end is welded to the aluminium member.

In the case where, for a particular application, the metals, forming the ends of the connection and which are defined by the nature of the members to be assembled, can be welded only with difficulty, it is possible, within the scope of the invention as defined by the accompanying claims, to insert a third metal between the two metals which are to form the connection, said third metal being readily weldable through the method forming the object of the invention to each of the two first metals to be considered.

The following description of embodiments of the invention given by way of example will show, reference being made to the accompanying drawings, various features of the invention; in the drawings:

FIGS. 1 to 3 illustrate diagrammatically the welding procedure as applied to the two metal parts which are to form the connection.

FIGS. 4 and 5 illustrate diagrammatically the execution of the connection through reversed extrusion.

FIG. 6 shows the connection in its non-machined condition, as obtained after extrusion.

FIG. 7 illustrates the same connection after the finishing step.

FIG. 8 shows a similar connection obtained in a conventional manner.

FIG. 9 illustrates the embodiment of a connection similar to that of FIG. 7, as obtained through a direct extrusion.

FIGS. 10 to 13 illustrate a further procedure, as applied to tubes or sockets.

The execution of a connection starting from two bar sections 1–2 will first be described, one of said bars being made of copper and the other of aluminium for instance (FIG. 1).

Each of said bar sections 1 and 2 is fitted inside a frusto-conical chamber formed in a corresponding steel block, 3, 4 respectively, said blocks being adapted to be urged suddenly towards each other in an axial direction as illustrated in FIG. 2 on a much larger scale. According to a conventional method, said sudden movement of the parts towards each other provides for the welding of said two parts 1 and 2 along an area defined by the line 5 (FIG. 2) while producing an outer bead 6 of weld material.

Upon subsequent separation of the two steel blocks 3 and 4, the two metal parts thus welded together are held fast inside the recess in one of the blocks; in particular, if the frusto-conical recesses considered have different apical angles, the welded parts will always be held inside the recess, the apical angle of which is smaller. In the case where the welding operation is not satisfactory, each part remains in the corresponding recess and this provides means for checking whether the welding has been correctly executed or otherwise.

During a subsequent operation, the bead or burr formed by the weld 6 is sheared for instance by making the welded connection 1–2 pass through a ring 7 of a suitable diameter, said ring being shown in FIG. 3 as moving in the direction of the arrow F.

The blank thus obtained is now inserted inside the recess 8 of die 9 (FIG. 4) into which may sink a punch 18. The radius of said punch is defined with reference to the radius of the recess 8 in a manner such that the difference between said two radii may be equal to the thickness of the wall of the connection to be obtained.

As shown in FIG. 4, the sinking of the punch in the direction of the arrow F1 produces through a reversed extrusion a rising of metal into the space 1a (FIG. 5) between the die and punch, said metal forming the end of the part 1 of the blank. The operation continuing, the metal forming the part 2 of the blank rises in its turn. This being done, a rough connection, as illustrated in FIG. 6, is obtained, wherein the welded area between the parts 1 and 2, shown by the line 11, appears as a frusto-conical surface.

Thus, the welded area is much larger than in the case of a normally obtained connection of the type illustrated in FIG. 8. Furthermore, the extruding operation has an effect similar to that of a forging so that the connection according to the invention is highly advantageous as disclosed hereinabove.

In a subsequent stage, the closed bottom end 12 of the blank is removed in a conventional manner and this leads to the obtention of the finished connection illustrated in FIG. 7.

It is also possible to resort to a direct extruding method illustrated in FIG. 9, according to which the sinking of the punch drives the metal through the die 13. Said punch includes a first section 14 the radius of which is smaller than the radius of the corresponding narrower section 15 of the die opening, said section 14 being rigid with a second section 16 of a diameter which is substantially equal to that of the corresponding larger section 17 of the die opening. Consequently, the metal forming the part 1 of the blank cannot rise and is urged downwardly into the space between the outer surface of the punch at 14 and the inner surface of the die at 15.

It is also possible to proceed in the manner illustrated in FIGS. 10 to 13, starting from two tubular sections 18, 19 (FIG. 10) or from two sockets 20 and 21 (FIG. 11) which latter are arranged in a manner such that their closed bottom ends 22, 23 face each other.

In this case of FIGS. 10 to 13, the two blocks 24, 25 inside the annular recesses of which are fitted the parts 18, and 19, or 20 and 21, as the case may be, for the execution of the desired weld, form two frusto-conical punches 26, 27 engaging the bores in the corresponding parts which are to be assembled into the shape of a tubular connection. Said punches 26 and 27 have a height such that, after welding, there is obtained a common closed bottom 28 separating the inner bores of the blank parts into two, or at least one inner bead inside said bore. Said closed bottom or bead may be removed, which leads to the obtention of the blank 28 illustrated in FIG. 13. In either case, the blank 28 obtained through this welding method is subjected to an extrusion in accordance with the reversed extruding method illustrated in FIGS. 4 and 5 or preferably through the direct extrusion method, as illustrated in FIG. 9, and it is possible to obtain thus a tube having a considerable length with reference to its diameter.

The embodiments of the invention which have just been described are obviously given solely by way of exemplification and many modifications may be brought thereto within the scope of the accompanying claims.

What I claim is:

1. A method for producing a bimetallic tubular member consisting in:
   (a) positioning each of a copper slug and an aluminium slug in a respective frusto-conical chamber in a respective steel block, each said chamber being an outwardly opening recess in the surface of its respective block, each of said slugs initially filling the major portion of its respective chamber and extending a short distance beyond said surface of its respective block;
   (b) bringing opposing ends of said slugs abruptly together to cold weld the abutting surfaces together;
   (c) removing the welded parts from said blocks;
   (d) positioning same so that they extend longitudinally of the cylindrical opening in a die; and
   (e) by means of a cylindrical punch, cold extruding the welded parts to form a tubular section of aluminium connected at one end portion to a tubular section of copper by said welding.

2. The method as recited in claim 1 wherein the frusto-conical chamber in one of said blocks has a different apical angle than the frusto-conical chamber in the other one of said blocks.

3. A method as recited in claim 1 wherein each of said chambers comprises a solid frusto-conical projection which is concentric with its respective recess and which extends from the inner base of said recess to a point just below said surface of its respective block, the diameter of said projection decreasing as it approaches said surface, and each of said slugs is initially tubular in form.

4. A method as recited in claim 3 wherein each of said slugs are initially in the form of a hollow cylinder.

References Cited in the file of this patent

UNITED STATES PATENTS

| | | |
|---|---|---|
| 1,379,063 | Van Allen | May 24, 1921 |
| 1,724,032 | Leck | Aug. 13, 1929 |
| 1,779,607 | Lewis et al. | Oct. 28, 1930 |
| 1,948,242 | Schubarth | Feb. 20, 1934 |
| 2,161,905 | Watson | June 13, 1939 |
| 2,679,931 | Cigliano | June 1, 1954 |
| 2,698,548 | Sowter | Jan. 4, 1955 |
| 2,765,528 | Buffet | Oct. 9, 1956 |
| 2,816,211 | Hutchins | Dec. 10, 1957 |
| 2,986,273 | Bardgett | May 10, 1961 |
| 3,042,428 | Gardner | July 3, 1962 |
| 3,106,013 | Rozmus | Oct. 18, 1963 |

FOREIGN PATENTS

| | | |
|---|---|---|
| 676,207 | Great Britain | Jan. 23, 1952 |
| 768,211 | Great Britain | Feb. 13, 1957 |